Nov. 30, 1943.   F. S. EVES ET AL   2,335,269
LIQUID PRESSURE REMOTE CONTROL SYSTEM
Filed April 21, 1941   6 Sheets-Sheet 1

INVENTORS
F. S. Eves
A. C. Bamford
BY
ATTORNEYS

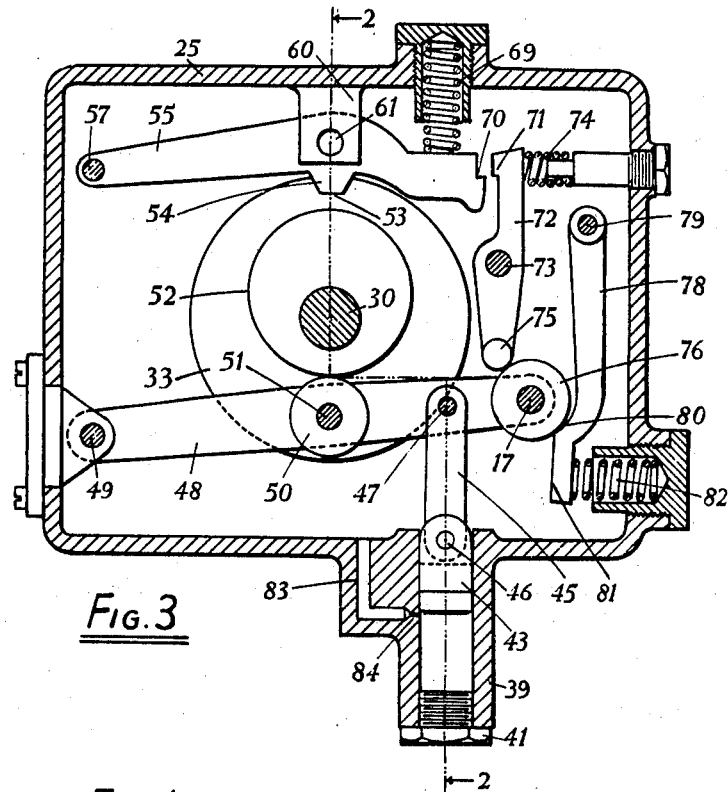
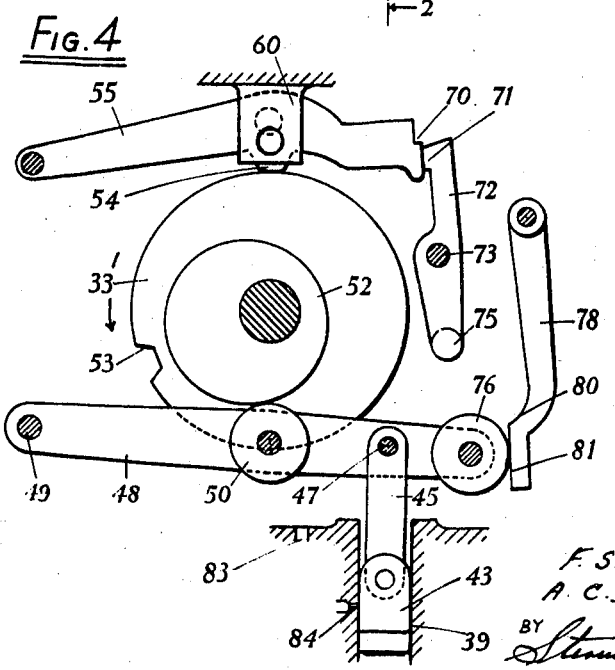

Nov. 30, 1943.　　F. S. EVES ET AL　　2,335,269
LIQUID PRESSURE REMOTE CONTROL SYSTEM
Filed April 21, 1941　　6 Sheets-Sheet 3

INVENTORS
F. S. Eves
A. C. Bamford
BY
Stevens and Davis
ATTORNEYS

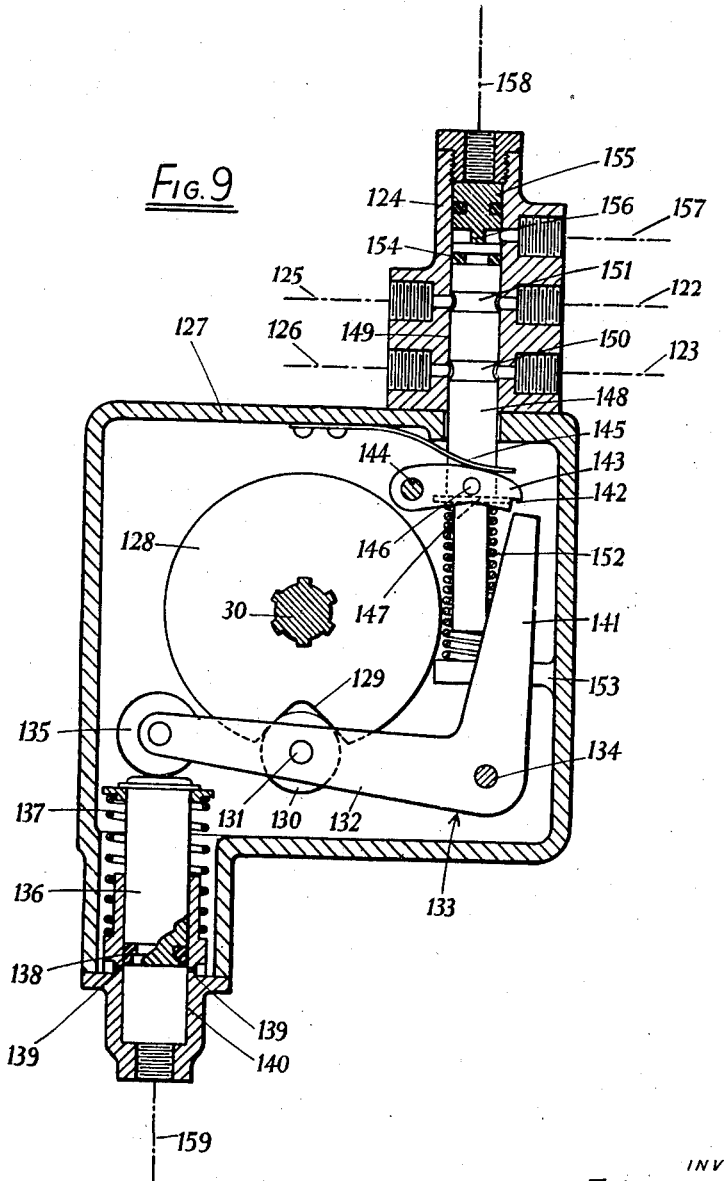

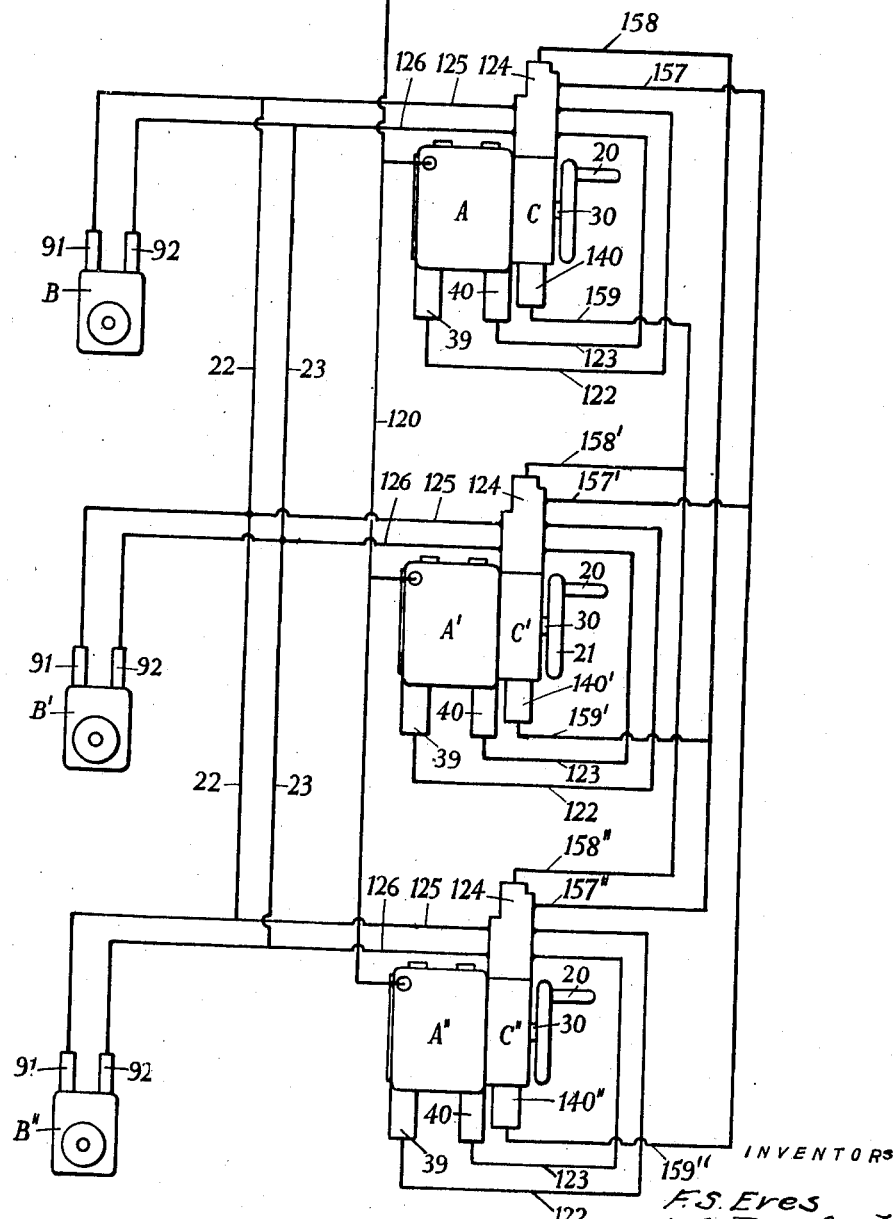

Nov. 30, 1943.    F. S. EVES ET AL    2,335,269
LIQUID PRESSURE REMOTE CONTROL SYSTEM
Filed April 21, 1941    6 Sheets-Sheet 6

INVENTORS
F. S. Eves
A. C. Bamford.
BY
Stevens and Davis
ATTORNEYS

Patented Nov. 30, 1943

2,335,269

UNITED STATES PATENT OFFICE 2,335,269

LIQUID PRESSURE REMOTE CONTROL SYSTEM

Frederick Sydney Eves, Leamington Spa, and Alfred Chadburn Bamford, Bootle, Liverpool, England, assignors to Automotive Products Company Limited, Leamington Spa, England, a British company, and Chadburn's (Ship) Telegraph Company Limited, Bootle, Liverpool, England, a British company, jointly Application April 21, 1941, Serial No. 389,674
In Great Britain April 29, 1940

4 Claims. (Cl. 60—54.5)

This invention relates to liquid pressure remote control systems, and it has for its primary object to provide an improved form and construction of system in which means are incorporated to ensure that the slave unit or units of the system are operated in accordance with movements imparted to the transmitter pump or like master unit of the system.

The invention has particular utility in connection with the order telegraph devices such as are used on ships for the purpose of transmitting instructions, say from the bridge to the engine room. It is, therefore, a further object of the invention to provide a robust and efficient order telegraph system which is operated hydraulically.

A further object of the invention is to provide means for ensuring that the operated member, for example the distant pointer of a ship's telegraph, is moved accurately to any one of a plurality of predetermined positions, irrespective of any slight inaccuracies which there may be in the transmitting mechanism, due for instance to the use of long lengths of pipeline or to rough usage of the system.

In a liquid pressure remote control system having a transmitter pump arranged to bring about reciprocation of one or more motor units, according to one feature of the invention, locking means are provided in the transmitter pump and come into action automatically at a predetermined stage to prevent further operation of said transmitter pump until such time as said locking means are released by the motor unit or units.

Further, a liquid pressure remote control system is provided in which a transmitter unit comprises a pair of cylinder and piston devices operated by a spindle, wherein means responsive to the direction in which the spindle is rotated are arranged to connect operatively one or other of the cylinder and piston devices to the spindle, depending upon the direction in which the said spindle is rotated, the unconnected device remaining inoperative all the time that said rotation is continued.

The invention further provides for a liquid pressure remote control system, a transmitter pump comprising a pair of cylinders, pistons slidable in said cylinders, a rotary actuating spindle, and selective drive transmitting means whereby one only of the pistons is moved relative to its cylinder when the spindle is rotated clockwise, and the other of said pistons is alone moved relative to its cylinder when the spindle is rotated anti-clockwise.

As a still further feature of the invention there is provided for a liquid pressure remote control system, a motor unit comprising a pair of independently operable cylinder and piston devices connected respectively with a rotary spindle by a pair of ratchet devices which are arranged to act in opposite directions, whereby reciprocation of one cylinder and piston device turns the spindle in one direction, and reciprocation of the other cylinder and piston device turns the spindle in the other direction.

Further, an improved ship's or like telegraph system is provided, in which movements imparted to a transmitter actuate one or more distant indicators by means of a liquid pressure remote control system, as described herein.

The invention is illustrated by way of example in the accompanying diagrammatic drawings, in which:

Figure 3 is a sectional elevation of the transmitter pump taken on the line 3—3 of Figure 2;

Figure 4 is a fragmentary view corresponding to Figure 3 but showing the internal parts in different positions;

Figure 9 is a sectional elevation of an auxiliary locking device for use where a plurality of transmitter pumps are to be used interchangeably to operate one or more motor units;

Figure 10 is a circuit diagram of a system embodying the auxiliary locking devices;

Figure 1:
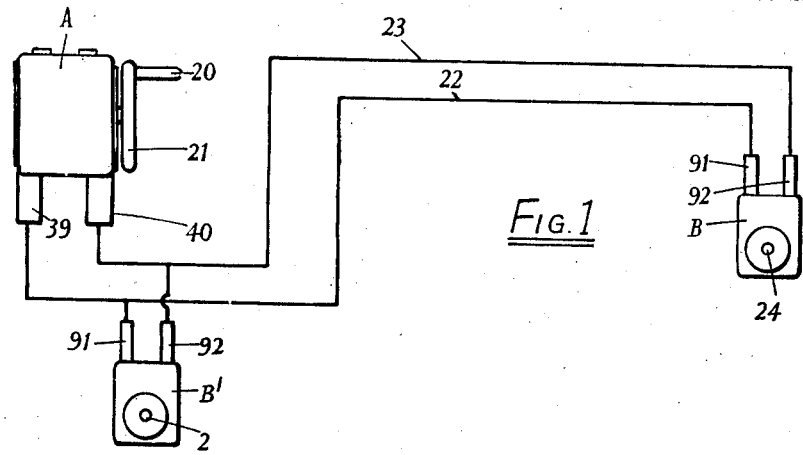
Figure 1 shows a simple form of remote indicating system.

The liquid pressure remote control system which is shown in Figure 1 comprises a transmitter unit A which is provided with an operating handle 20 and wheel 21 and is connected by a pair of pipe lines 22 and 23 with a pair of motor units B and B', said motor units being arranged in parallel across the pipe lines 22 and 23. Each is provided with a spindle 24, which is arranged to move angularly in steps, one step for each complete rotation of the wheel 21 of the transmitter unit A.

Figure 5:
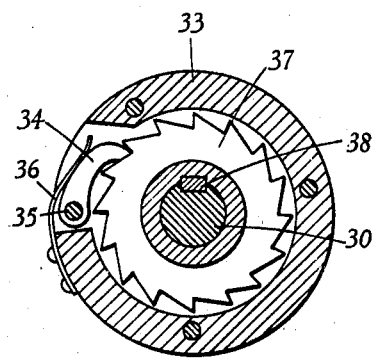
Figure 5 is a sectional elevation of one of the transmitter ratchet devices, the section being taken on the line 5—5 of Figure 2.

The transmitter unit A comprises a substantially rectangular casing 25 having end plates 26 and 27 carrying bearings 28 and 29 for an operating shaft or spindle 30, to which latter the wheel 21 (Figure 1) is secured. Within the casing 25 the shaft 30 carries a pair of ratchet devices indicated generally at 31 and 32, each of said devices comprising a substantially cylindrical drum member 33 which is freely rotatable upon the shaft 30, and which carries a pawl 34 (see Figure 5). This pawl is accommodated within a cut-away portion of the drum member 33 and is pivotally mounted upon a pin 35, a leaf spring 36 being arranged to urge said pawl 34 inwards into engagement with a ratchet wheel 37 secured nonrotatably upon the shaft 30 by means of a key 38.

The ratchet devices 31 and 32 are arranged to transmit a drive in opposite directions, so that when the shaft 30 is turned in a clockwise direction (as viewed from the right-hand end of said shaft) the drum member 33 of the ratchet device 31 is rotated, but the drum member of the ratchet device 32 remains stationary. Conversely, when the shaft is rotated in an anti-clockwise direction, the ratchet device 32 is driven, while the ratchet device 31 slips.

Figure 2:
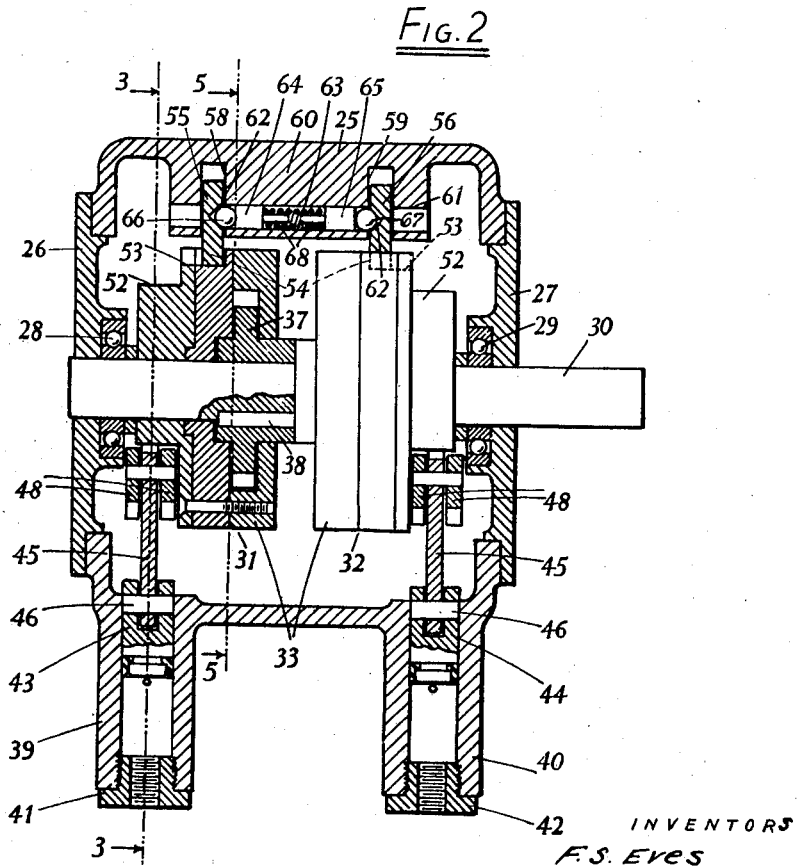
Figure 2 is a sectional elevation drawn to an enlarged scale to show the internal construction of the transmitter pump, the section being taken on the line 2—2 of Figure 3.

The bottom of the casing 25 is formed with a pair of cylinders 39 and 40, which are provided with screw plugs 41 and 42 for connection to the pipe lines 22 and 23 respectively (see Figure 1). Pistons 43 and 44 are slidable within the cylinders 39 and 40, each of said pistons being connected pivotally with a corresponding link 45 by means of a pin 46. The upper end of the link 45 is pivotally connected at 47 with a follower lever 48, which latter conveniently comprises a pair of bars arranged side by side, as seen in Figure 2. The follower lever 48 is pivotally anchored to the casing 25 by means of a pin 49 and at a position approximately halfway along its length it carries a freely rotatable follower roller 50 mounted upon a pin 51. This roller is adapted to engage with an eccentric cam 52, which is secured to or forms part of the corresponding drum member 33, so that as the latter rotates, downward force is imparted to the follower lever 48 during every alternate half revolution of the drum member 33. This downward movement is of course imparted to the corresponding piston 43, and it will thus be seen that when the shaft 30 is rotated clockwise the piston 43 is operated, whereas anti-clockwise rotation of the shaft 30 actuates the piston 44.

As each complete revolution of the shaft 30 corresponds with one step of movement of the motor units B and B', locking means are provided for preventing the direction of rotation of the shaft 30 from being reversed except when said shaft is in a predetermined zero position, for example with the handle 20 uppermost. For this purpose each of the drum members 33 is formed at one place in its periphery with a substantially trapezoidal recess 53, which is adapted to be engaged by a correspondingly shaped projection 54 formed upon the underneath of a locking lever. The locking lever for the ratchet device 31 is indicated at 55, while the locking lever for the ratchet device 32 is shown at 56, each being pivoted to the casing 25 at 57. The sloping surfaces of the recess 53 and projection 54 are arranged so that the projection rides out of the recess as the corresponding drum member 33 rotates, although of course when the locking lever 55 or 56 is held down, the rotation of the drum member 33 is positively prevented. The locking levers 55 and 56 pass through substantially rectangular notches 58 and 59 in a thickened web member 60 formed in the top of the casing 25, said web member having a longitudinal bore 61 intersecting both of the notches 58 and 59. On their inwardly facing sides the locking levers 55 and 56 have conical recesses 62, which register with the bore 61 when the projections 54 are fully engaged with the recesses 53. A spring 63 disposed within the bore 61 serves to urge apart a pair of cylindrical thrust pieces 64 and 65, which in turn urge a pair of balls 66 and 67 into engagement with the conical recesses 62. Spigots 68 formed upon the thrust pieces 64 and 65 are adapted to butt against one another, thus limiting the extent to which the thrust pieces 64 and 65 can approach one another. The distance separating the spigots 68 when the parts are disposed in the positions shown in Figure 2, with both of the locking levers 55 and 56 in their lowered and operative positions, is arranged to be sufficient for allowing only one of the balls 66 or 67 to be ejected from its recess 62. Thus either of the locking levers 55 and 56 can be raised, but when one is raised the other is positively locked in its down position, the parts 64, 65, 66, 67 and 68 constituting an axially continuous thrust member which prevents the other ball 66 or 67 from moving out of its recess 62.

The shaft 30 is shown in its zero position in Figures 2 and 3, and it will be seen that it can be rotated in either direction, the parts resuming their original positions when one complete revolution has taken place. Supposing, however, that the shaft 30 has been rotated through part of a revolution with, say, the ratchet device 31 driving, and an attempt is made to reverse the direction of rotation, the drive will be transferred from the ratchet device 31 to the ratchet device 32, the drum member 33 of which latter is of course prevented from rotating, as its locking lever 56 is being positively held down by the ball 67. Therefore reverse rotation cannot take place and it is necessary for the movement of the shaft 30 to proceed in uni-directional units, each composed of one complete revolution. The locking levers 55 and 56 are each urged towards their operative positions by a coiled compression spring 69.

Locking means are also provided for arresting the movement of the shaft 30 whenever it reaches its zero position should the piston 43 (or 44) which is being operated not have reached its fully raised position. It should be mentioned that the pistons 43 and 44, in being moved downwardly by the corresponding eccentric cam 52, force liquid into the motor units B and B' against the force exerted by springs as will be hereinafter explained, so that when the piston 43 (or 44) is free to rise, liquid is expelled from the motor units B and B' at a moderate pressure and thus raises said piston as far as is permitted by the eccentric cam 52. Separate locking means are provided for the respective ratchet devices 31 and 32, said means being similar in construction and being shown in Figures 3 and 4. The end of the locking lever 55 (or 56) is formed with a step 70 which is adapted to be engaged by a projection 71 formed at the top of a catch lever 72, which is pivoted to the casing 25 at 73, and is urged resiliently towards the locking lever by a coiled compression spring 74. At its lower end, the catch lever 72 is formed with a pin 75, which is adapted to co-operate with a roller 76 pivotally mounted upon a pin 17 at the free end of the follower lever 48. A restoring arm 78, pivoted to the casing 25 at 79, has at its lower part a cam surface composed of two portions indicated at 80 and 81 respectively. The restoring arm 78 is urged towards the roller 76 by a coiled compression spring 82 and when the piston 43 is at or adjacent its uppermost position, the roller 76 engages with the cam surface 80, which is obliquely disposed so that the force of the spring 82 is utilised to raise the piston 43 (or 44) through the last portion of its upward travel, and to retain it and the follower lever 48 in their fully raised positions, so long as the corresponding drum member 33 is in its zero position, as shown in Figure 3. It will be noted that with the parts in this position the roller 76 engages the pin 75, and thus deflects the catch lever 72, so that the catch projection 71 is held out of engagement with the step 70 of the locking lever.

The cam surface 81 is arranged so as to lie substantially parallel with the direction in which the roller 76 moves as the piston 43 (or 44) proceeds downwards within its cylinder, so that the spring 82 then exerts no force at all tending to move the follower lever about its pivot 49. This is clear from Figure 4, which indicates the position of the parts when the drum member 33 of the ratchet device 31 has been turned in the direction of the arrow, the recess 53 having reached the position shown. It will be seen that the roller 76 has left the pin 75 of the catch lever 72, so that the upper end of the latter bears against the locking lever 55, said locking lever of course being in its raised position. As the drum member 33 continues to turn, the piston 43 is moved to the bottom of its stroke and then as the drum member 33 proceeds with the second half of its revolution, the piston 43 is forced upwardly by the liquid which is returned at moderate pressure from the motor units B and B'. This action is not of course assisted by either the eccentric cam 52 or the cam surface 81 of the restoring arm 78; if, therefore, the piston 43 lags in relation to the eccentric cam 52, the catch lever 72 remains operative when the recess 53 is next engaged by the projection 54 of the locking lever, and the catch projection 71 consequently engages with the step 70, said projection thus positively holding the drum member 33 against further rotation in either direction until such time as the piston 43 has reached its fully raised position. When this happens the roller 76 re-engages with the pin 75 and releases the catch projection 71 from the step 70.

The interior of the casing 25 is used as a storage reservoir for spare working liquid and it is connected by a passage 83 with a small orifice 84 leading into the cylinder 39 (or 40) at a position which is below the lower edge of the piston 43 (or 44) when the latter is fully raised. The cam surface 80 is arranged to take charge of the piston just before the orifice 84 is uncovered so that the piston and follower lever 48 are raised, and remain in their raised positions, despite the fact that the interior of the cylinder 39 (or 40) is connected with the reservoir so as to allow the pipe line 22 (or 23) to breathe in the known manner. When the piston 43 (or 44) moves downwardly, the orifice 84 is closed at the very first part of the stroke and thereafter liquid pressure is created in the cylinder.

Figure 6:
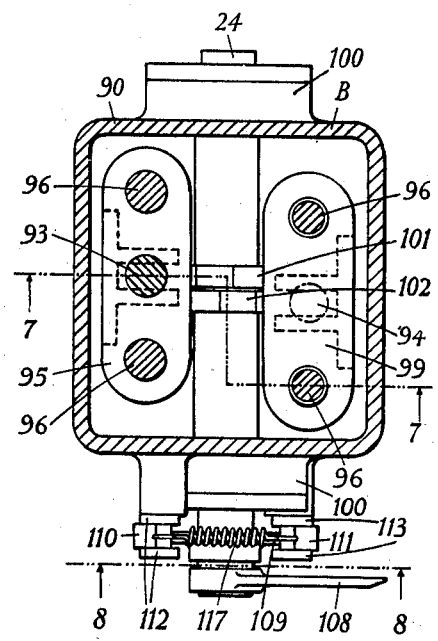
Figure 6 is a sectional plan of one of the indicating motor units, the section being taken on the line 6—6 of Figure 7.
Figure 8:
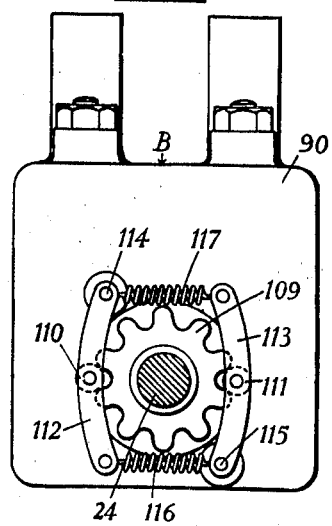
Figure 8 is another sectional elevation of the motor unit taken on the line 8—8 of Figure 6.
Figure 7:
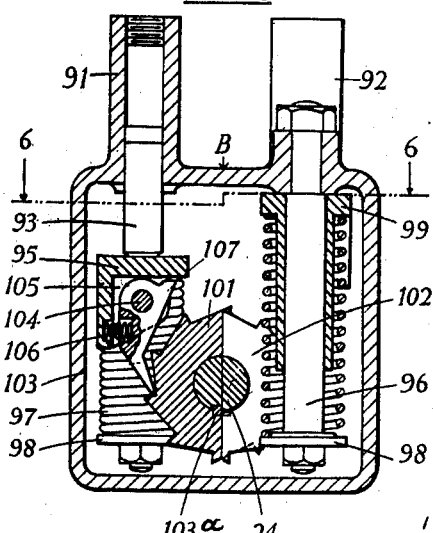
Figure 7 is a sectional elevation of the motor unit taken on the line 7—7 of Figure 6.

The construction of the preferred form of motor unit is shown in Figures 6, 7 and 8, and comprises a casing 90 which is formed in its top part with a pair of motor cylinders 91 and 92 respectively for connection with the pipe lines 22 and 23 from the transmitter unit A (see Figure 1). Each of these cylinders contains a slidable piston, one of which is shown at 93, while the position of the other is indicated at 94 in Figure 6, said pistons being arranged to bear downwards upon yoke members 95 and 99 which are fitted slidably upon fixed vertical guide rods 96. These guide rods are surrounded by relatively strong coiled compression springs 97 which are adapted to bear at their upper ends against the yoke members 95 and 99, and at their lower ends against washers 98 carried by the guide rods. The spindle 24 is fitted rotatably in bearings 100 in the ends of the casing 90, and has two ratchet wheels 101 and 102 fastened to it non-rotatably by means of a key 103a, the teeth of said ratchet wheels being arranged in opposite directions, as will be seen in Figure 7. The ratchet wheel 101 is adapted to be engaged by a pawl 103, which is pivotally mounted about a pin 104 extending between a pair of webs 105 formed upon the yoke member 95. The pawl 103 is urged towards the ratchet wheel 101 by a coiled compression spring 106, but this movement is restricted by a stop 107 adapted to engage with the underside of the yoke member 95. Thus when the piston 93 is in its fully raised position the pawl 103 is completely out of engagement with the ratchet wheel 101 and said pawl is in the correct position for advancing the ratchet wheels through an angle corresponding to one tooth the next time pressure liquid is supplied to the cylinder 91. A similar ratchet pawl (not shown) is provided in connection with the yoke member 99 and acts upon the ratchet wheel 102 so as to turn the latter in a clockwise direction each time the piston 94 is moved downwards to the bottom of its stroke. It will be realised that the piston 93 as shown in Figure 7 is in its lowermost position, and that the force exerted by the compressed springs 97 tend to raise said piston 93, and thus create liquid pressure within the cylinder 91.

As the motor unit shown in Figures 6, 7 and 8 is used at the receiving or indicating end of a ship's telegraph system, it is desirable that the angular position of the spindle 24, after each liquid pressure actuation, should be precisely set irrespective of the varying factors, such as the speed of operation of the transmitter unit, the prevailing temperature, leakage of liquid and other conditions, which might give rise to slight variations in the stroke of the piston 93 (or 94). The spindle 24 in a ship's telegraph would be provided with a pointer 108, which would require to be brought accurately into register with any one of a plurality of indications, and to secure this result efficiently, a toothed wheel 109 in the nature of a star wheel with rounded teeth is secured to the spindle 24 and is engaged by a pair of rollers 110 and 111 carried by a pair of curved levers 112 and 113, pivoted to the casing 90 at 114 and 115 respectively. The free ends of the levers 112 and 113 are urged inwards by coiled tension springs 116 and 117 which act to hold the rollers 110 and 111 in firm engagement between consecutive pairs of teeth upon the wheel 109, thus locating the latter and the spindle 24.

It will be seen that in operation the initial part of each step-by-step movement of the spindle 24 causes the rollers 110 and 111 to be forced outwardly by the teeth of the wheel 109, thus tensioning the springs 116 and 117 and storing energy which is utilised during the latter part of the movement step, to turn the spindle 24 to the precise angular position which is desired. By this means the pointer 108 is moved to and centered accurately over the order or other indication, irrespectively of any slight inaccuracy there may be in the movement of the piston 93 (or 94).

In the system shown in Figure 1 the transmitter unit A is arranged to operate two motor units, B and B', so that the swept volume of the cylinder 39 should be substantially equal to the sum of the displacements of the pistons in the cylinders 91 of the motor units; similarly the cylinder 40 of the transmitter unit A should have a capacity substantially equal to the sum of the displacements of the pistons in the cylinders 92. Clearly, the system can be arranged so that a single transmitter unit A serves to operate simultaneously any number of motor units, such as B and B', provided that the cylinder capacity of the transmitter unit is substantially equal to the sum of the capacities of the corresponding cylinders of the motor units. The motor units need not be identical, for each may be best suited to the work which it has to do, and it is conceivable that a single transmitter unit may be utilised to operate simultaneously motor units of different sizes. The locking means in the transmitter unit effectively keep the latter in phase with the motor units, and in the system shown in Figure 1, the motor unit B' can conveniently be disposed adjacent to the transmitter unit A so as to indicate to the operator the prevailing setting of the distant motor unit B.

The liquid pressure remote control system can, if desired, be arranged with a plurality of transmitter units, any one of which is adapted to operate a set of motor units, and one such system is illustrated in Figure 10. Three transmitter units A, A' and A'', have their casings connected to a common pipe line 120 leading to a reservoir 121 for spare working liquid. The cylinders 39 and 40 of each transmitter unit are connected by pipes 122 and 123 with an auxiliary control valve 124 forming part of an auxiliary locking device indicated at C, C', or C'', which is incorporated in the corresponding transmitter unit. From each auxiliary control valve 124 a pair of pipes 125 and 126 feed pressure liquid from the transmitter unit into a pair of main pipe lines 22 and 23, which feed in common a number of motor units, say three in number, indicated at B, B' and B''.

The construction of each of the auxiliary locking devices is shown in Figure 9, and it comprises an auxiliary casing 127, which is arranged to be fitted upon the end of the casing 25 of the transmitter unit, the shaft 30 being extended and being provided with a wheel 21 and handle 20 as before. The extended portion of the shaft 30 is conveniently splined, as shown in Figure 9, for the reception of a disc 128 which, at one position in its periphery, is formed with a substantially V-shaped notch 129. When the shaft 30 is in its zero position, this notch is engaged by a roller 130, which is freely rotatable upon a pin 131 carried by the piston actuating arm 132 of a bellcrank lever 133, pivoted to the auxiliary casing 127 at 134. A roller 135 mounted at the free end of the arm 132 is arranged to depress an auxiliary piston 136 against the action of a coiled compression return spring 137. The piston 136 is slidably mounted within an auxiliary cylinder 140, and when said piston is in its fully raised position its packing cup 138 just uncovers a pair of breathing orifices 139 adapted to connect the working space of the cylinder with the space within the auxiliary casing 127, which space communicates with the casing of the corresponding transmitter unit and thus with the reservoir 121. The bellcrank lever 133 has an upwardly extending arm 141, the extremity of which is adapted to be engaged by a step 142 formed in a stop pawl 143 which latter is pivoted to the auxiliary casing 127 at 144 and is urged in a downward direction by a leaf spring 145. This stop pawl has a pin 146 which is engaged by a flange 147 carried by a piston valve member 148, so that when said piston valve member is in its top position the stop pawl 143 is held clear of the arm 141.

The piston valve member 148 extends slidably into a bore 149 in the body of the auxiliary control valve 124, and it has a pair of circumferential grooves 150 and 151 arranged, when the piston valve member is in its raised position as shown, to connect the pipes 122 and 123 with the pipes 125 and 126 respectively, these pipes being indicated in broken lines in Figure 9. The piston valve member 148 is urged towards its raised position by a coiled compression spring 152 bearing at its lower end upon a lug 153 within the auxiliary casing 127, and said piston valve member is provided at its upper end with an annular packing ring 154. The top part of the bore 149 is occupied by a valve operating piston 155 having a spigot 156 for the purpose of maintaining, above the piston valve member 148, a liquid space which, when the valve member is in its raised position, is in communication with a pipe indicated at 157; the top surface of the valve opening piston 155 is subject to liquid pressure in a pipe indicated at 158. It will thus be seen that the piston valve member can be moved downwards against the action of the spring 152 so as to isolate the pipes 122 and 123 from the pipes 125 and 126 respectively, in either of two ways. Firstly, liquid pressure can be admitted through the pipe 157 so as to act upon the piston valve member 148 directly; secondly, if liquid pressure is admitted to the pipe 158, it acts upon the valve operating piston 155, thus forcing the latter downwards and consequently shifting the piston valve member 148. In either event downward movement of the piston valve member causes the stop pawl 143 to engage with the bellcrank lever 133 and thus prevent the roller 130 from riding out of the notch 129 in the event of a turning force being applied to the shaft 30. When the piston valve member is depressed, therefore, the shaft 30 is locked and the corresponding transmitter unit cannot be operated in either direction. On the other hand, when the piston valve member is raised the bellcrank lever 133 is free, so that the initial part of each revolution of movement of the shaft 30 causes the arm 132 to be depressed, thus moving the auxiliary piston 136 downwards within the cylinder 140, and expelling liquid under pressure through a pipe indicated at 159 when once the orifices 139 have been closed.

It will be seen in Figure 10, that the pipe 159 from the auxiliary cylinder 140 of the auxiliary locking device C is connected with the top of the control valve 124 of the auxiliary locking device C' by means of a pipe indicated at 158' and also in a similar manner with the control valve device 124 by a pipe 158''. Further, the pipe 159' from the auxiliary cylinder of the auxiliary locking device C' leads by the pipe 158 to the top of the control valve device 124 of the auxiliary locking device C, and by a pipe 157'' with the space between the valve operating piston 155 and the piston valve member 148 belonging to the auxiliary locking device C''. In the case of the auxiliary locking device C'', the cylinder indicated at 140'' is connected by a pipe 159'' with the pipe 157' entering the valve housing 124 just below the valve operating piston of the auxiliary locking device C', and by the pipe 157 with the auxiliary locking device C. As a result of this arrangement of the auxiliary locking devices C, C' and C'', only one of the transmitter units can be operated at a time, and as soon as one of said units has its handle moved away from its zero position, the other two transmitter units are automatically locked. Supposing, for example, that the handle 20 of the transmitter unit A is rotated, the initial movement of said handle causes liquid to be rapidly ejected from the cylinder 140, which liquid acts upon the valve operating pistons of the auxiliary locking devices C', C'', thus forcing down the corresponding piston valve members. This effects two different functions in each of the auxiliary locking devices C', C'', namely, it causes the main pipe lines 22 and 23 to be isolated from the cylinders 39 and 40 of the transmitter units A', A'', and thus from the reservoir 121 with which said cylinders communicate; it further causes the stop pawl 143 to come into action, so mechanically locking the shafts 30 of the transmitter units A' and A''. As soon as the handle 20 of the transmitter unit A resumes its zero position, the piston 136 of the auxiliary locking device C is forced upwardly by its return spring 137, and this permits the piston valve members 148 belonging to the auxiliary locking device C' and C'' to resume their normal raised positions. A similar action occurs if the transmitter unit A' or the transmitter unit A'' is operated. It will be apparent that by suitably modifying the control valve device 124 by the provision of more than one valve operating piston 155 any number of transmitter units A, A', etc., can be incorporated in the system for interchangeable operation. Thus the provision of two valve operating pistons arranged end to end would enable a fourth transmitter unit to be employed, and so on.

Figure 11:
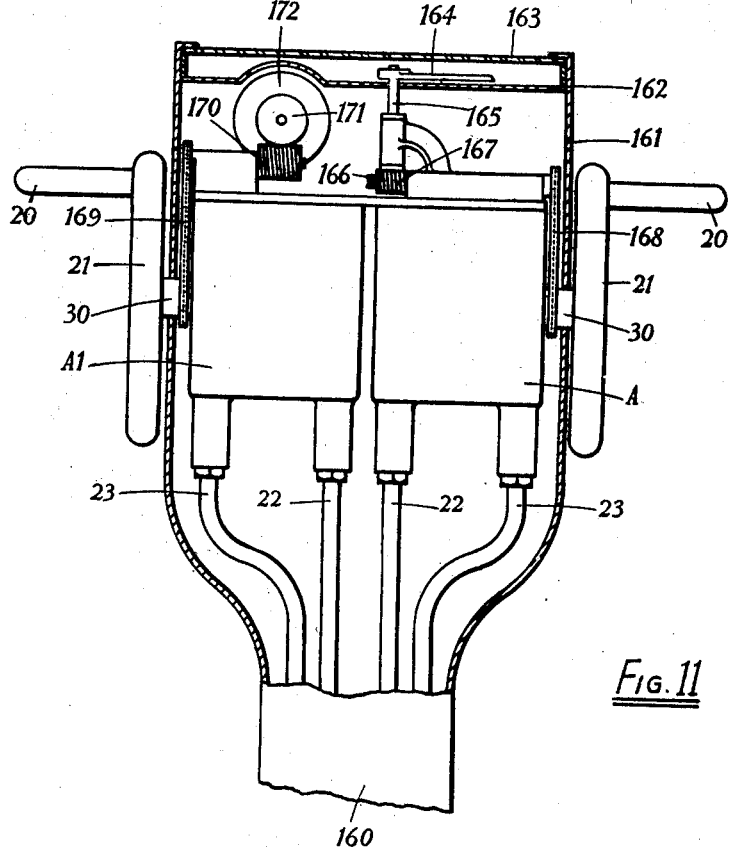
Figure 11 is a sectional elevation of an order transmitter for a ship's telegraph embodying a pair of the improved transmitter pumps.
Figure 12:
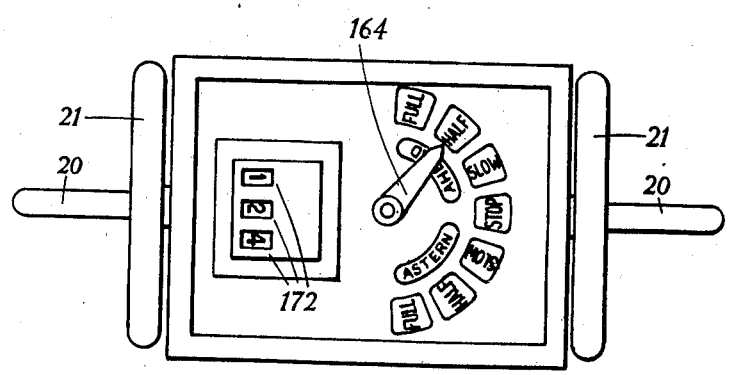
Figure 12 is a plan of the order transmitter shown in Figure 11.

Figures 11 and 12 show one adaptation of the invention to the transmitter of a ship's telegraph, provision being made for transmitting to the engine room, and/or any other distant station, the exact number of engine revolutions required, in addition to the more customary orders, namely, "Stop" and "Full," "Half" and "Slow," for both ahead and astern. The transmitter comprises the usual column 160 which is enlarged at its upper part to form a box 161 having a dial plate 162 which can be viewed through a glass top 163. The box 161 contains a pair of transmitter units indicated at A and $A_1$, each of which works independently of the other and is arranged in the manner shown in Figure 1, so as to deliver pressure liquid through either of a pair of pipe lines 22 and 23, leading to one or more distant motor units (not shown) when the corresponding handle 20 is rotated. In the installation illustrated, the transmitter unit A is used to give the customary orders to the engine room staff, and the prevailing setting of the system is indicated to the operator by a pointer 164 which is adapted to move angularly over the dial plate 162 in the customary manner. The pointer 164 is carried by a vertical spindle 165 having a worm wheel 166 which is driven by a worm 167. The latter is fastened to a spindle connected operatively with the shaft 30 of the transmitter unit A by means of an endless chain 168. The transmitter unit $A_1$ is used for operating hydraulically a remote motor unit which drives a drum or other step-by-step type of counter adapted to show the precise number of revolutions per minute for the engines, and in the case of this transmitter unit, an endless chain 169, driven from the shaft 30, rotates a worm 170 which, by means of a worm wheel 171, operates a counter of the cyclometer type, indicated at 172.

The systems described are of course given merely as examples and various modifications in the construction may be made, without departing from the invention.

What we claim is:

1. In a liquid pressure remote control system, a cyclic pump, at least one cyclic motor operatively connected therewith to be driven thereby, means for locking said pump against movement at the completion of each cycle of operation, and means responsive to completion of the cycle of movement of said motor for releasing said locking means.

2. In a liquid pressure remote control system, a cyclic pump, at least one resiliently loaded single acting piston and cylinder motor operatively connected thereto to be driven thereby, means for locking said pump against movement at the completion of each cycle of operation, and means responsive to the return to said pump of the liquid displaced thereby in one cycle of operation for disengaging said locking means, the return of said liquid being effected by the resilient loading of said piston and cylinder motor, whereby a second cycle of movement of said pump cannot be initiated until the first cycle of the motor is complete.

3. In a liquid pressure remote control system, a pair of piston and cylinder units, a rotatable spindle for displacing the movable portion of a unit a fixed distance per spindle revolution, means responsive to the direction of rotation of said spindle for selectively displacing the movable portion of one or the other of said units, means for confining the rotation of said spindle to unidirectional units of 360° each, means for locking said spindle at the completion of each unit of movement, means for receiving and returning the liquid displaced by a piston and cylinder unit and means responsive to the return of the liquid replaced for releasing the means locking the spindle.

4. In a liquid pressure remote control system, a pair of piston and cylinder units comprising a transmitter pump, a rotatable spindle, a pair of eccentrics one adapted to displace each of the pistons, a pair of ratchet and pawl devices arranged in opposition for selectively driving one or the other of said eccentrics dependent upon the direction of rotation of said spindle, means responsive to rotation of said spindle in one direction for locking it against rotation in the other direction until said spindle has completed 360° of movement, an eccentric follower operatively connected to each piston, remote means responsive to displacement of each piston for storing energy, conduits connecting each remote means with its respective piston and cylinder unit, means responsive to 360° of movement of said spindle for locking the same against movement, and means responsive to the return of said piston by action of the stored energy for releasing said last named locking means.

FREDERICK SYDNEY EVES.
A. C. BAMFORD.